INVENTOR
ANTHONY FONTANA

INVENTOR
ANTHONY FONTANA

BY
*William H. King*
ATTORNEYS

INVENTOR
ANTHONY FONTANA

*INVENTOR*
ANTHONY FONTANA

BY

William H. King
ATTORNEYS

INVENTOR
ANTHONY FONTANA

ATTORNEYS

United States Patent Office 3,389,260
Patented June 18, 1968

3,389,260
SOLAR SENSOR HAVING COARSE AND FINE SENSING WITH MATCHED PREIRRADIATED CELLS AND METHOD OF SELECTING CELLS
Anthony Fontana, Hampton, Va., assignor to the United States of America as represented by the Administrator of the National Aeronautics and Space Administration
Filed Dec. 8, 1964, Ser. No. 416,943
13 Claims. (Cl. 250—203)

ABSTRACT OF THE DISCLOSURE

A solar sensor having geometrically opposed coarse and fine sensing elements. The elements are located on the pitch and yaw axes and arranged to provide full spherical field of view. Certain of the elements are preirradiated and then matched according to their degradation rates. The sensor has no moving parts thus being particularly adapted for the space environments.

The invention described herein may be manufactured and used by or for the Government of the United States of America for governmental purposes without the payment of any royalties thereon or therefor.

The invention relates generally to a solar sensor and more specifically to a solar sensor having both coarse and fine sensing elements.

A solar sensor is a device whose electrical output provides sufficient information to allow a determination of both magnitude and direction of the instantaneous angular pointing error of the null axis of the sensor relative to the solar vector. In other terms, a solar sensor is a device which, when used as an output to an attitude control system, provides for the orientation of a specified axis of a space vehicle toward the center of the solar disk.

The primary disadvantage of the prior developed solar sensors is that they have been designed to meet the needs of specific applications and thus either do not possess all the desirable characteristics of a general purpose sensor or do not have these desirable characteristics developed to the point of meeting the ever increasing demands of present and future space missions. Many of the prior developed and conceived sensors are too simple to meet the stringent demands of advanced solar missions. Other sensors are too complicated to be reliable enough for use in long duration solar missions. A most outstanding disadvantage of the prior art sensors is their lack of adequate protection from high energy particles and micrometeorites of the space environment which limit the sensor's usable life.

The present invention is a dual sensor composed of coarse sensing elements, which are used during capture from large error angles, and fine sensing elements, which are used during accurate pointing. The sensing elements are made up of silicon solar cells connected in series. Geometrically opposed coarse sensing elements and geometrically opposed fine sensing elements are electrically connected in a battery bridge circuit for the purpose of obtaining a signal output whose electrical polarity indicates the direction of the pointing error. The coarse sensing elements, located on both the pitch and yaw axes, provide the sensor with a full spherical field-of-view and thus the capability of capturing the solar target from an initial error of 180°. The fine sensing elements are preirradiated and then matched according to their degradation rates, thus reducing the possibility of null shifts of the sensor. The sensor has no moving parts, consumes no power other than solar power, has a nonsaturating output throughout its field-of-view which allows rapid damping of angular disturbances, and is designed to provide maximum protection from high energy particles and micrometeorities of the space environment.

It is an object of this invention to provide a general purpose solar sensor.

It is another object of this invention to provide a solar sensor having a nonsaturating output throughout its full field-of-view which allows rapid damping of angular disturbances.

It is a further object of this invention to provide a solar sensor which minimizes the degradation of the solar cell sensor transducers by providing them with maximum protection from high energy protons and micrometeorites.

Still another object of this invention is to provide a solar sensor having a spherical field-of-view with the capability of capturing the solar disk from an initial error angle of 180°.

A still further object of this invention is to provide a solar sensor having both coarse and fine sensing elements thus increasing the sensitivity of the sensor when the pointing error nears zero.

Yet another object of this invention is to provide a solar sensor that is less likely to have null shifts with use than prior art solar sensors.

Yet still another object of this invention is to provide a solar sensor having no moving parts.

Other objects and advantages of this invention will further become apparent hereinafter and in the drawings, in which.

Figure 1:
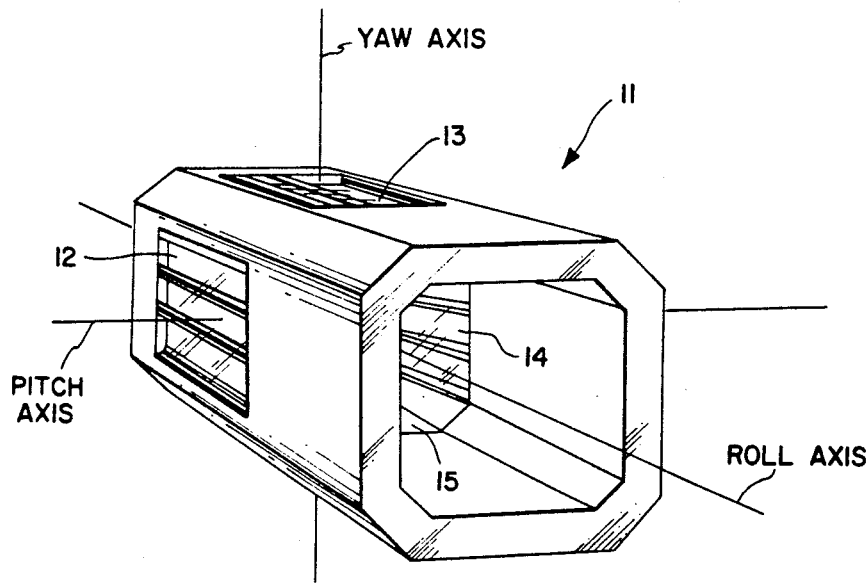
FIG. 1 is a perspective drawing showing the geometric design of the fine sensor and the relative locations of the coarse and fine sensing elements used by this invention.

In describing the preferred embodiment of the invention illustrated in the drawings specific terminology will be resorted to for the sake of clarity. However, it is not intended to be limited to the specific terms so selected, and it is to be understood that each specific term includes all technical equivalents which operate in a similar manner to accomplish a similar purpose.

Figure 2:
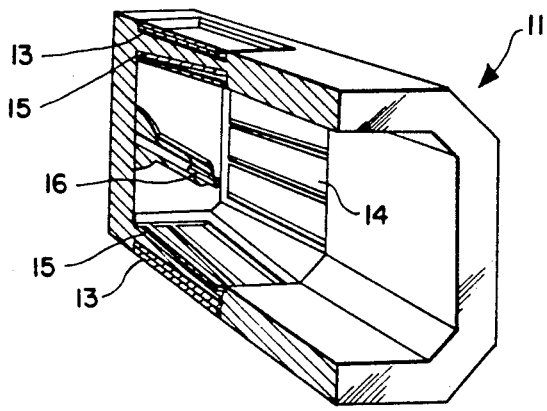
FIG. 2 is a cross-sectional view of FIG. 1.

Turning now to the specific embodiment of the invention selected for illustration in the drawings, the number 11 in FIGS. 1 and 2 designates generally the housing for the sensing elements of this invention. Located on each of the four sides of housing 11 and on the outside surface thereof are coarse sensing elements 12 and 13 and located on the four sides of housing 11 on the inside surface thereof are fine sensing elements 14 and 15. Each of the sensing elements 12–15 are made up of three silicon solar cells connected in series. Attached to the closed end of housing 11 on the inside thereof is a sensor switch triggering element 16 consisting of a photoconductive cell. When nonilluminated triggering element 16 has a high interial resistance and when illuminated it has a low internal resistance. The manner in which sensing elements 12–15 and triggering element 16 are connected in an electrical circuit will be discussed later in the specification. As can be seen from FIG. 2, when the pointing error of housing 11 is greater than an angle predetermined by the geometric design of housing 11 the triggering element 16 will be nonilluminated and will have a high internal resistance, and when the pointing error is less than this predetermined angle the triggering element 16 will be illuminated and will have a low internal resistance. In operating conditions the closed end of housing 11 will be attached to the nose of the space vehicle that is to be controlled. It should be noted at this point that the coarse sensor elements 12 and 13 are located on the outside surfaces of housing 11 for purposes of explanation only. In an actual space mission the coarse sensing elements 12 and 13 must be located on the outer extremes of the payload so that the field-of-view of the coarse sensor is not obstructed by any part of the payload.

The geometric design of the housing 11 provides for radiation protection for the fine sensing elements 14 and 15 by limiting their field-of-view to a small angle, or in other words, by limiting the radiation dosage rate to a small percentage of the omnidirectional space radiation dosage rate. The above assumes that while housing 11 is shielding the fine sensing elements it is a perfect protector to the fine sensing elements. This implies that housing 11 is infinitely thick. The housing 11 is constructed of 2024–T4 aluminum having a density of 2.7 g./cm.$^3$ which at an average thickness of ¼ inch provides a shielding of 1.7 g./cm.$^2$. A shielding of 1.7 g./cm.$^2$ is effectively infinite for short duration space missions, but for extended duration space missions steel at a density of 8 g./cm.$^3$ and an average thickness of ¼ inch provides a more adequate shielding of 5 g./cm.$^2$.

Figure 3:
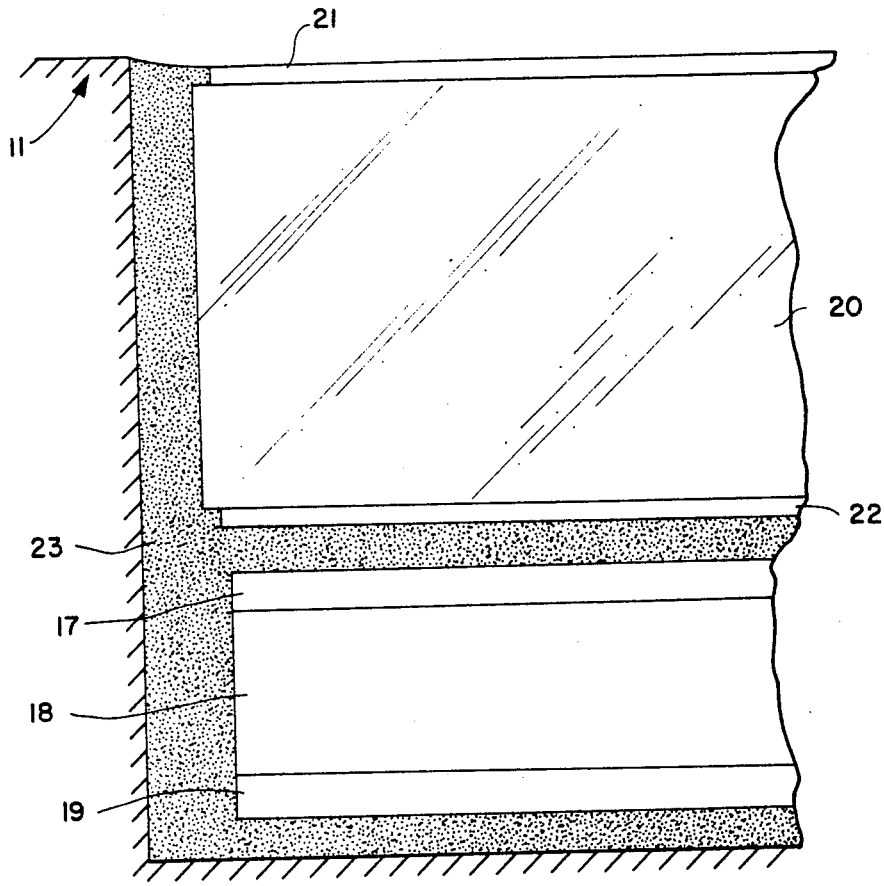
FIG. 3 is a schematic diagram of the construction of the sensing elements used by this invention.

The construction of the sensing elements 12–15 is illustrated schematically in FIG. 3. Each of the standard silicon solar cells of the sensing elements consists of an N layer of semiconductor material 17, a P layer of semiconductor material 18 and a layer of solder 19 bonded together. The sensing element is covered by a sapphire window 20, which is coated with an antireflection coating 21 and an optical coating 22. The sensing element and sapphire window are bonded together in the housing 11 by a bonding agent 23. The antireflection coating 21 and the optical coating 22 are deposited in multiple layers on the sapphire window 20. These coatings are used to keep the bonding agent from darkening because of exposure to ultraviolet radiation, to protect the solar cells from radiation and to reduce the operating temperature for the solar cells thereby making them more sensitive.

Sapphire was chosen as the material to be used as cover window 20 because of its resistance to degradation in a radiation environment and because of its relatively high density as compared to the glasses. The actual thickness of the sapphire windows is 0.60 inch, but because of the 10° mounting angle of the fine sensing elements and their limited fields-of-view, the solar radiation for these elements has an average angle of incidence with the sapphire windows of 67.5° which gives an average effective window thickness of 1.57 inch.

The N/P silicon solar cells have been chosen as the solar cells to be used since N/P silicon solar cells are more resistant to radiation damage than P/N silicon solar cells. The superiority of the N/P silicon solar cell can be attributed to the following facts. First, radiation damage in the form of crystal defects occur from 0.25 to 1 micron below the cell's surface. The junction between the P-type and N-type semiconductor is located near 0.25 micron below the cell's surface. Therefore, most of the radiation damage occurs in the cell's base material. Second, there is a direct relationship between the minority diffusion length and the cell's output. The diffusion constant of electrons in P-type silicon (the base material for the N/P cell) is 38 cm.$^2$/sec. while the diffusion constant of holes in N-type silicon (the base material for the P/N cell) is only 13 cm.$^2$/sec. Third, the type of recombination centers (crystal defects) produced by radiation in P-type silicon are less effective in shortening the minority carrier diffusion length than those produced in N-type silicon.

The resistivity of the base material must be considered when selecting the solar cell which is most resistant to radiation damage. Silicon solar cells with higher base material resistivity are more resistant to radiation damage than those cells with lower base material resistivities. Base materials with a resistivity of 10 ohm-cm. are used by this invention.

The spectral response of a silicon solar cell degrades much more with irradiation at the longer wavelengths than at the shorter wavelengths. Therefore, by use of the optical coating 22 that is vacuum deposited in multilayers on the inside of sapphire window 20, the longer wavelengths of solar radiation to which the cells respond are reflected, thus reducing the effective amount of degradation.

Probably the most effective and powerful technique for increasing a silicon solar cell's resistance to radiation damage is that of preirradiation. A preirradiated silicon solar cell is much more resistant to radiation damage than it would have been had it not been preirradiated. Consequently, the silicon solar cells used by this invention are preirradiated.

A secondary, but important, advantage of the preirradiation technique is that it makes possible the degradation rate matching of the silicon solar cells which are used by this invention. Solar cells which initially degrade equal amounts for a given radiation dosage continue to degrade equally at higher radiation dosages. Therefore, during the process of preirradiating solar cells to be used in the construction of a solar sensor, it is convenient to set aside pairs of cells which have shown equal degradation rates. By placing one member of a matched pair in one sensing element and the other member in the opposing sensing element, etc., it is possible to insure that the opposing sensing elements will degrade equally in the space environment; thus, the possibility of null shift of the solar sensor's output can be eliminated.

The output of silicon solar cells decrease with increasing cell temperature. Because of this relationship between output and temperature, the sensitivity of the solar sensor can be maximized by operating the sensing elements at the lowest possible temperature. In addition to reducing the effective amount of degradation, optical coating 22 provides thermal protection for the sensing elements by reflecting infrared (long wave length) radiation, thus increasing the sensivity of the solar sensor.

Figure 4:
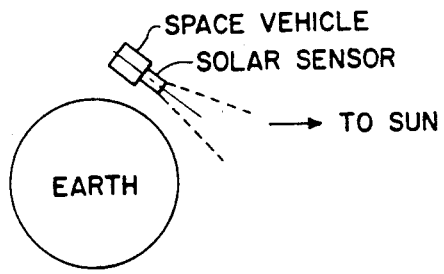
FIG. 4 is a pictorial drawing used for the purpose of showing generally how the present invention operates.

Referring now to FIG. 4 a general description of the operation of the present invention will be given. Assuming that the solar sensor that constitutes this invention is orbiting the earth on a space vehicle as shown in FIG. 4, it is desirable that the solar sensor point in the direction of the sun while the sun is visible. The field-of-view of the fine sensing elements of the solar sensor is defined by the dotted lines shown in FIG. 4. Coarse sensing elements for the solar sensor are on the outside surface of the space vehicle and therefore have a full spherical field-of-view. Assume that the space vehicle has an attitude such that the sun is not within the field-of-view of the solar sensor's fine sensing elements. Then the sun will not be illuminating the triggering element 16 shown in FIG. 2. As will be explained later, this renders the fine sensing elements inoperative and the coarse sensing elements operative. The coarse sensing elements will therefore sense the attitude of the space vehicle and produce an electrical signal which will be applied to the attitude control system of the space vehicle to bring the attitude of the space vehicle around to a point where the solar sensor more nearly points in the direction of the sun. At the instant that the sun comes within the field-of-view of the fine sensing elements of the solar sensor the triggering element 16 becomes illuminated thereby rendering the fine sensing elements operative and the coarse sensing elements inoperative. The fine sensing elements will then be able to point the solar sensor in the direction of the sun with very litle pointing error. The coarse sensing elements alone could be used to point the solar sensor in the direction of the sun, but the error would be much greater since the coarse sensing elements, being on the outside surface of the space vehicle, will be illuminated from both the sun and the reflection of the sun from the earth. The solar sensor, by using both coarse and fine sensing elements, can be very accurately pointed in the direction of the sun even if it has a 180° initial pointing error.

Figure 5:
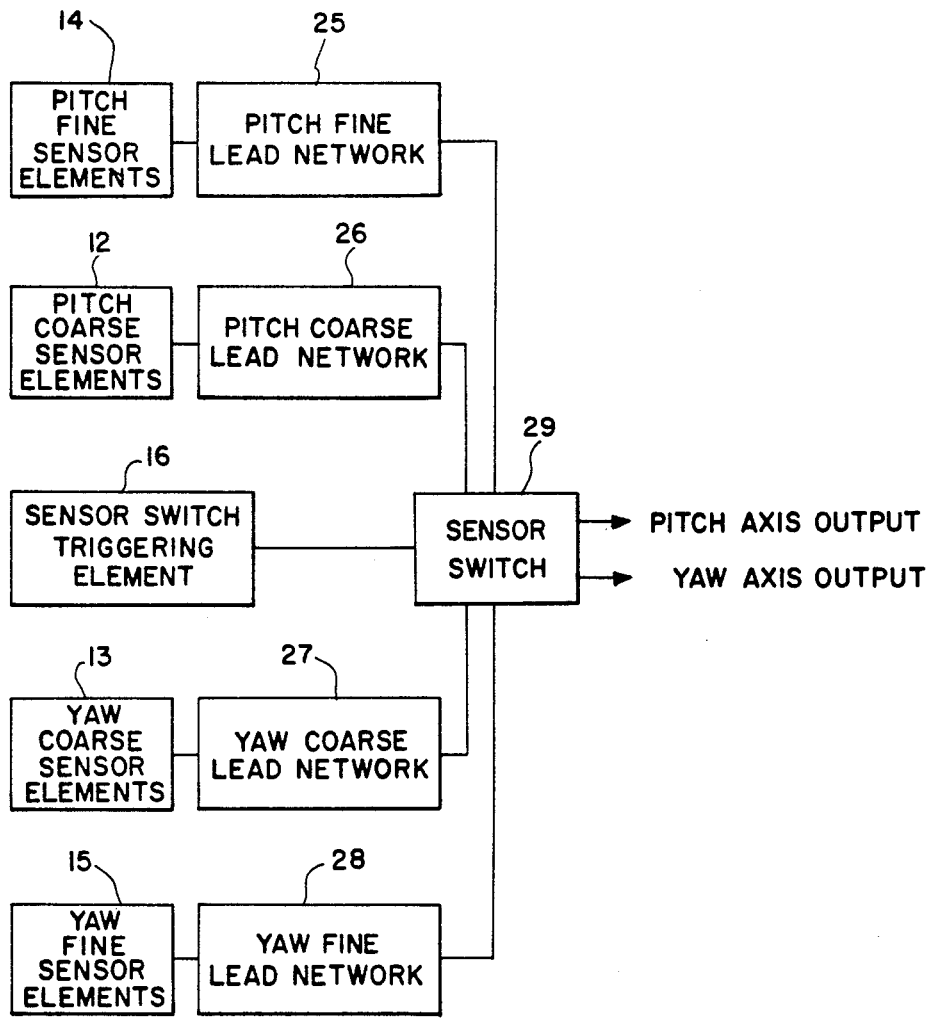
FIG. 5 is a block diagram of this invention.

A block diagram of the invention is shown in FIG. 5. The outputs from the pitch fine sensor elements 14 are applied through a pitch fine lead network 25 to a sensor switch 29; the output of the pitch coarse sensor elements 12 is applied through a pitch coarse lead network 26 to sensor switch 29; the output of the yaw coarse sensor elements 13 is applied through a yaw coarse lead network 27 to sensor switch 29; and the output from the yaw fine sensor elements 15 is applied through a yaw fine lead network 28 to sensor switch 29. The output from the sensor switch triggering element 16 is applied to sensor switch 29. The triggering element 16 selects which inputs applied to sensor switch 29 are to pass through it. The output from triggering element 16 actuates sensor switch 29 in a predetermined manner such that selected ones of the inputs to sensor switch 29 pass through the sensor switch. Sensor switch 29 has two outputs: one the pitch axis output and the other the yaw axis output. Each of these outputs is applied to the attitude control system of the space vehicle on which the solar sensor is located to control the attitude of the space vehicle.

Figure 6:
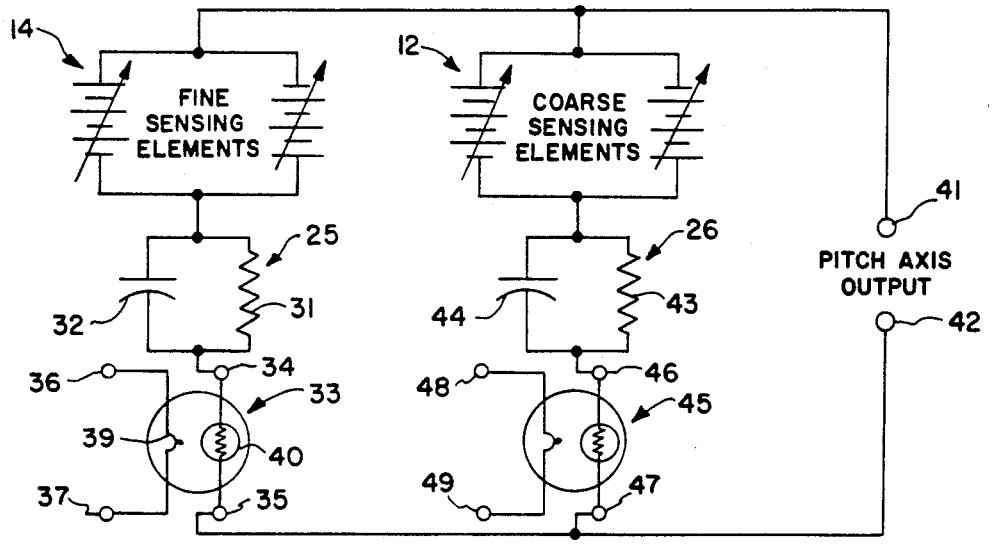
FIG. 6 is a schematic diagram of the electrical circuitry used to produce the pitch axis output.
Figure 7:
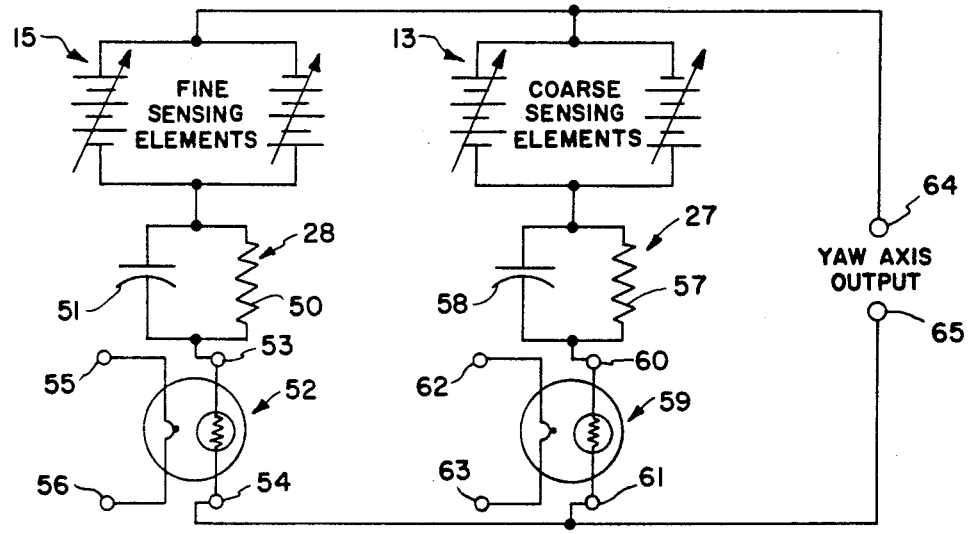
FIG. 7 is a schematic diagram of the electrical circuitry used to produce the yaw axis output.

The electrical circuitry in the block diagram of FIG. 5 will now be described while referring to the schematic diagram shown in FIGS. 6, 7, and 8. In FIG. 6 two fine sensing elements 14 are connected in parallel with opposite polarity terminals connected together. These sensing elements are connected in series with pitch fine lead network 25 consisting of a resistor 31 and a capacitor 32 connected in parallel. The resulting series network is connected in series with a four terminal switch 33 across pitch axis output terminals 41 and 42. The four terminal switch 33 can be an electro-optical device manufactured under the trade name of "Raysistor" by Raytheon Corporation. The four terminals of switch 33 are 34, 35, 36, and 37. When a potential is applied to terminals 36 and 37 an incandescent light source 39 is energized. The radiation from the incandescent light source 39 causes a photoconductive cell 40 to reduce its internal resistance thus converting a virtual open circuit across terminals 34 and 35 to a virtual short circuit. Consequently, while a potential is applied across terminals 36 and 37 the output from fine sensing elements 14 appears across pitch axis output terminals 41 and 42. Since the switching terminals of switch 33 are completely isolated from the controlling circuitry, the output of the solar sensor is not contaminated by electronic noise. The switch 33 has no moving parts and is therefore, exceptionally rugged with an inherently long operating life.

The two coarse sensing elements 12 are connected in parallel with their opposite polarity terminals connected together. This parallel circuit is connected in series with pitch coarse lead network 26 consisting of a resistor 43 and a capacitor 44 connected in parallel. The resulting series network is connected in series with a switch 45 across pitch axis output terminals 41 and 42. Switch 45 has four terminals 46, 47, 48, and 49, and is exactly like the switch 33 previously described. As has been explained with reference to switch 33, when a potential appears across terminals 48 and 49 the voltages produced by coarse sensing elements 12 appear across pitch axis output terminals 41 and 42. In FIG. 7 the two fine sensing elements 15 are connected in parallel with their opposite polarity terminals connected together. This parallel circuit is connected in series with the yaw fine lead network 28 consisting of a resistor 50 and a capacitor 51 connected in parallel. The resulting series network is connected in series with a switch 52 across axis output terminals 64 and 65. Switch 52 has four terminals 53, 54, 55, and 56 and is identical to switch 33 previously described. The two coarse sensing elements 13 are connected in parallel with their opposite polarity terminals connected together. This parallel circuit is connected in series with yaw coarse lead network 27 consisting of resistor 57 and capacitor 58 connected in parallel. The resulting series network is connected in series with a switch 59 across yaw axis output terminals 64 and 65. Switch 59 has four terminals 60, 61, 62, and 63 and is identical to switch 33. If a potential is applied across terminals 55 and 56, the output from fine sensing elements 15 is applied to output terminals 64 and 65; or if a potential is applied across terminals 62 and 63 the output from coarse sensing elements 13 is applied to output terminals 64 and 65.

Figure 8:
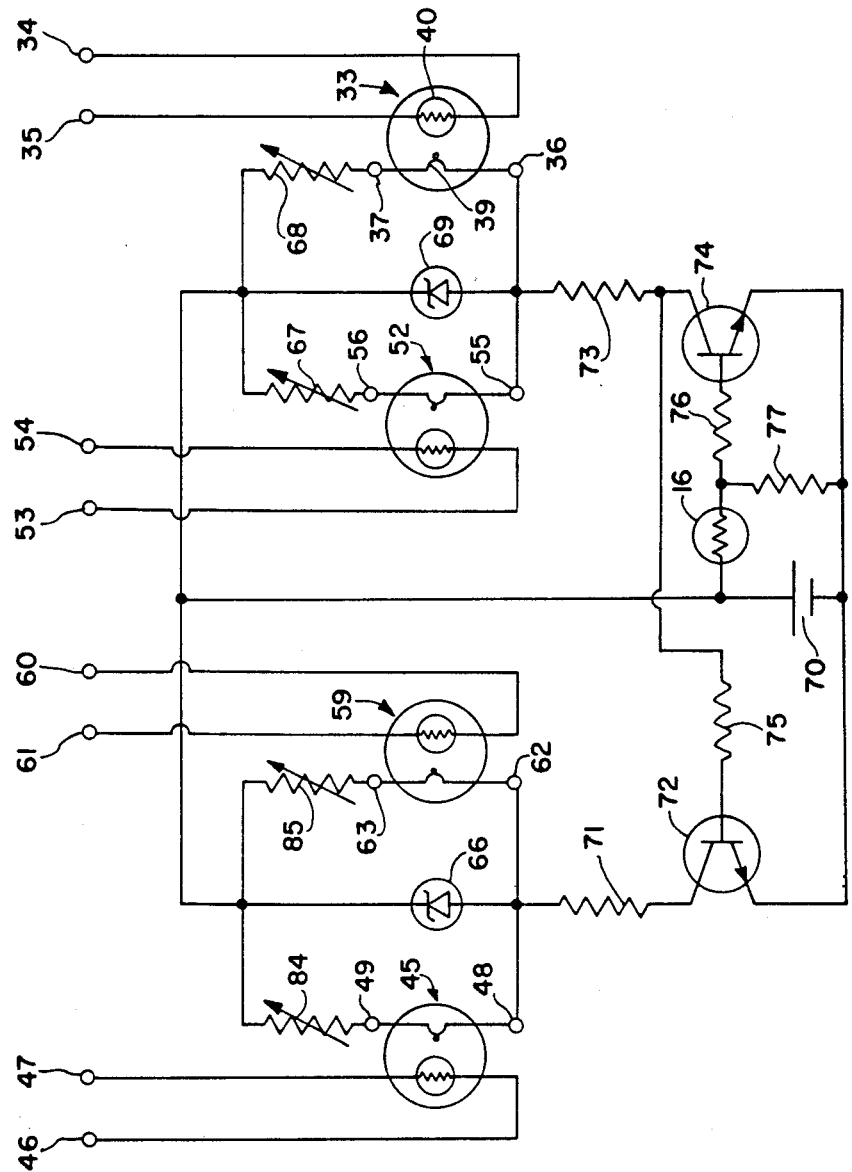
FIG. 8 is a schematic diagram of the electrical circuitry used in the sensor switch 29 shown in FIG. 5.

Referring now to FIG. 8 there is shown the electrical circuitry connected to the control terminals of switches 33, 45, 52 and 59. Terminals 48 and 49 of switch 45 are connected in series with a potentiometer 84; and terminals 62 and 63 of switch 59 are connected in series with a potentiometer 85. These two series circuits and a series circuit consisting of a Zener diode 66 are all connected in parallel. Terminals 55 and 56 of switch 52 are connected in series with a potentiometer 67; and terminals 36 and 37 of switch 33 are connected in series with a potentiometer 68. These two series circuits and a series circuit consisting of a Zener diode 69 are all connected in parallel. The unconnected terminals of potentiometers 84, 85, 67, and 68 are all connected together and to the positive terminal of a voltage source 70. Terminals 48 and 62 are connected through a resistor 71 to the collector of an NPN transistor 72; and terminals 36 and 55 are connected through a resistor 73 to the collector of an NPN transistor 74. The emitters of transistors 72 and 74 are connected directly to the negative side of voltage source 70. The base of transistor 72 is connected through a resistor 75 to the collector of transistor 74. The positive side of voltage source 70 is connected through triggering element 16 and resistor 76 to the base of transistor 74. The junction of triggering element 16 and resistor 76 is connected through a resistor 77 to the negative side of voltage source 70.

The operation of this invention will now be described while referring to FIGS. 1, 2, 4, 6, 7, and 8. When the solar sensor in FIG. 1 has a point error that is outside the field-of-view of the fine elements the coarse sensing elements 12 and 13 will be energized by the sun to produce a potential output and the triggering element 16 will not be illuminated causing it to have a nominal internal resistance of 1,000 megohms. In this high-resistance state, triggering element 16 prevents bias current from flowing into the base of transistor 74, thus holding transistor 74 in a nonconducting state. With no collector current flowing in transistor 74, the voltage across the control terminals of switches 33 and 52 is zero and the nominal internal resistance between the switching terminals of these switches is 300 megohms.

When transistor 74 is in a nonconducting state, transistor 72 is in a conducting state due to a positive bias current which flows through the filaments of switches 33 and 52, resistor 73, and resistor 75 into the base of transistor 72. The magnitude of this bias current is too small to produce a significant voltage at the control terminals of switches 33 and 52. The collector current flowing in transistors 72 causes Zener diode 66 to break down thus establishing a one-volt potential across the control terminals of switches 45 and 59. The internal resistance between the switching terminals of switches 45 and 59 is now approximately 400 ohms. Thus, when the solar sensor has a pointing error that is outside the field-of-view of the fine sensing elements 14 and 15, switches 33 and 59 disconnect the fine sensing elements from output terminals 41, 42 and 64, 65; and switches 45 and 59 connect coarse sensing elements 12 and 13 to output terminals 41, 42, and 64, 65.

When the pointing error of the solar sensor is within the field-of-view of the fine sensing elements, triggering element 16 is illuminated causing it to have a nominal internal resistance of 1,000 ohms. In this low-resistance state, the triggering element allows current to flow into the base of transistor 74, thus forcing it into a state of conduction. The resulting conduction of current through the collector of transistor 74 leads to the breakdown of Zener diode 69 and the application of proper voltage to the control terminals of switches 33 and 52. Thus, the switching terminals of switches 33 and 52 are now effectively shorted.

When transistor 74 is in its conducting state, transistor 72 is in its nonconducting state due to the fact that the positive end of resistor 75 is at zero potential. Therefore, the potential across the control terminals of switches 45 and 63 is zero, and effectively, there is an open circuit between the switching terminals of these switches.

Thus, when the pointing error of the solar sensor is within the field-of-view of the fine sensing elements 14 and 15 they are connected by switches 33 and 52 to the output terminals 41, 42 and 64, 65; and the coarse sensing elements 12 and 13 are disconnected by switches 45 and 59 from the output terminals 41, 42 and 64, 65. Zener diodes 66 and 69 serve as voltage regulators, thus providing a constant reference voltage for the control of the switches regardless of fluctuations in the supply voltage.

The 1 K potentiometers 84, 85, 67, and 68 are used to adjust the switch control voltages to their proper one-volt value. Resistors could be used instead of the 1 K potentiometers, but these resistors would then have to be accurately matched to each switch.

Resistors 76 and 77 form a voltage divider which determine the cut-on point of transistor 74. The values of these resistors are chosen such that solar radiation, which is incident upon the triggering element 16 when the sun is in its view, is sufficient to trigger the transistor, while earth-reflected solar radiation is of insufficient intensity to trigger the transistor.

The primary advantage of the present invention is that it possesses all the desirable characteristics of a general purpose sensor and has these characteristics developed to the peak of the state of the art and in a sensing unit which is the ultimate of simplicity.

It is to be understood that the form of the invention herewith shown and described is to be taken as a preferred embodiment. Various changes may be made in the shape, size, and arrangement of parts. For example, equivalent elements may be substituted for those illustrated and described herein, parts may be reversed, and certain features of the invention may be utilized independently of the use of other features, all without departing from the spirit or scope of the invention as defined in the following claims.

What is claimed is:

1. A solar sensor for producing an electrical output that is indicative of both magnitude and direction of the instantaneous angular pointing error of the null axis of the sensor relative to the solar vector comprising: parallel connected coarse sensing elements and parallel connected fine sensing elements; output terminals; a coarse lead damping network and a first switch connected in series with said coarse sensing elements across said output terminals; a fine lead damping network and a second switch connected in series with said fine sensing elements across said output terminals; and means for causing said first switch to be closed and said second switch to be open when said angular pointing error is greater than a predetermined value and for causing said first switch to be open and said second switch to be closed when said angular pointing error is less than said predetermined value whereby said coarse sensing elements supply said output terminals while said angular pointing is greater than said predetermined value and said fine sensing elements supply said output terminals while said angular pointing error is less than said predetermined value.

2. A solar sensor in accordance with claim 1 wherein said predetermined value is determined by the geometric design of the housing for said fine sensing elements; said fine sensing elements being located inside said housing; the housing shielding said fine sensing elements.

3. A solar sensor in accordance with claim 1 wherein each of said lead damping networks consists of a resistor and a capacitor connected in parallel.

4. A solar sensor in accordance with claim 1 wherein said first and second switches are electro-optical switches.

5. A solar sensor in accordance with claim 1 wherein the last mentioned means comprises: a photoconductive cell, that has a high internal resistance while nonilluminated and a low internal resistance while illuminated, located to be illuminated by solar rays only when said angular pointing error is less than said predetermined value; and electrical circuit means containing said photoconductive cell for closing said first switch and opening said second switch while said photoconductive cell is nonilluminated and for opening said first switch and closing said second switch while said photoconductive cell is illuminated.

6. A solar sensor in accordance with claim 1 wherein said sensing elements are N/P silicon solar cells.

7. A solar sensor in accordance with claim 1 wherein said sensing elements consists of solar cells that are preirradiated prior to use to increase their resistance to radiation damage.

8. A solar sensor in accordance with claim 1 wherein said sensing elements consists of solar cells that are preirradiated prior to use and then matched in pairs in accordance with their degradation rates to decrease the probability of null shifts.

9. A solar sensor in accordance with claim 1 wherein said sensing elements are covered by sapphire windows.

10. A solar sensor in accordance with claim 9 wherein said sapphire windows are coated with an optical coating to make the sensor more resistant to radiation damage and to give the sensor thermal protection.

11. A solar sensor for producing first and second outputs that are indicative of both magnitude and direction of the instantaneous angular pointing errors of two mutually perpendicular axes of the sensor relative to the solar vector comprising: a first pair of parallel connected fine sensing elements and a first pair of parallel connected coarse sensing elements located substantially perpendicular to a first of said two axes; a second pair of parallel connected fine sensing elements and a second pair of parallel connected coarse sensing elements located substantially perpendicular to the second of said two axes; first and second output terminals; a first fine lead network and a first switch connected in series with said first pair of fine sensing elements across said first output terminals; a first coarse lead network and a second switch connected in series with said first pair of coarse sensing elements across said first output terminals; a second fine lead network and a third switch connected in series with said second pair of fine sensing elements across said second output terminals; a second coarse lead network and a fourth switch connected in series with said second pair of fine sensing elements across said second output terminals; and means for causing said second and fourth switches to be closed and said first and third switches to be open while either of said angular pointing errors is greater than a predetermined value and for causing said second and fourth switches to be open and said first and third switches to be closed while both of said angular pointing errors are less than said predetermined value whereby said first pair of coarse sensing elements supply said first output terminals while either of said angular pointing errors is greater than said predetermined value and said first pair of fine sensing elements supply said first output terminals and said second pair of fine sensing elements supply said second output terminals while both of said angular pointing errors are less than said predetermined value.

12. A method of selecting solar cells for use in a solar sensor comprising the steps of: preirradiating the solar cells; selecting pairs of said cells which have shown equal degradation rates; and placing one member of said selected pair in one sensing element and the other member of said selected pair in the opposing sensing element.

13. In a solar sensor a control circuit for opening a first switch and closing a second switch while the pointing error of said solar sensor is greater than a predetermined value and for closing said first switch and opening said second switch while the pointing error of said solar sensor is less than said predetermined value comprising: a photoconductive cell that has a high internal resistance when nonilluminated and a low internal resistance when illuminated; means for shielding said photoconductive cell from the sun only when said pointing error is greater than said predetermined value; and means responsive to said photoconductive cell for opening said first switch and closing said second switch while said photoconductive cell has a high internal resistance and for closing said first switch and opening said second switch while said photoconductive cell has a low internal resistance; said means responsive to said photoconductive cell including first and second transistors with the collector of the first transistor connected to the base of the second transistor; a voltage source connected in series with said photoconductive cell and the base of said first transistor; and circuit means for connecting said second transistor in series with the control circuit of said first switch and for connecting said first transistor in series with the control circuit of said second switch.

References Cited

UNITED STATES PATENTS

| | | | |
|---|---|---|---|
| 3,205,362 | 9/1965 | Dryden | 250—203 |
| 3,229,102 | 1/1966 | Spencer et al. | 250—203 |
| 3,268,185 | 8/1966 | Eckermann | 250—203 X |
| 3,311,748 | 3/1967 | Volpe et al. | 250—203 |

RALPH G. NILSON, *Primary Examiner.*

M. A. LEAVITT, *Assistant Examiner.*